INVENTORS
LEGARE W. HOGE
RALPH L. PENDLEY
BY
ATTORNEY

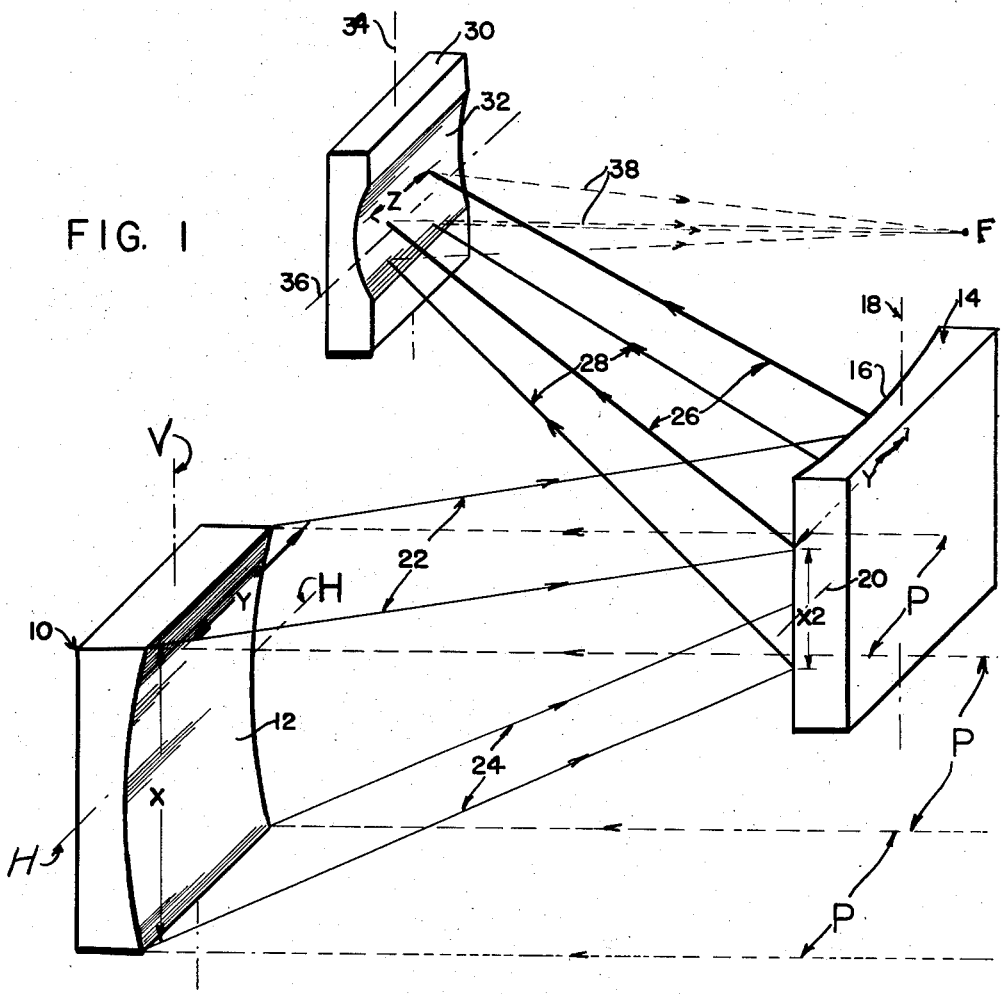

United States Patent Office 2,869,423
Patented Jan. 20, 1959

2,869,423

REFLECTIVE OPTICAL SYSTEMS

Legare W. Hoge and Ralph L. Pendley, Athens, Ga.

Application May 3, 1954, Serial No. 427,221

6 Claims. (Cl. 88—57)

This invention relates to a reflective optical system and more particularly to an arrangement of cylindrically curved optical surfaces of the sort which receives a pattern of incoming light and through a particular stage ultimately brings the pattern to a focal point.

The present system is an arrangement brought together for the purpose of gathering light rays, as from a distant image, in order to focus the image for any number of uses. For example, the present system may be used as the major light gathering portion of a telescope, microscope, field glass, or telephoto lens system. Contrasted to other optical arrangements which perform the same general function, the instant reflective optical system employs less expensive elements than those instruments which use the conventional spherical reflective surface with either prism arrangement or refractive lens element in order to receive the light image and reduce same to a convenient focal point. Furthermore, the present system arrives at a satisfactory focus virtually free of chromatic abberation and with a minimum of spherical and cylindrical abberation.

Those prior known systems which gather the light image by receiving the light rays in a generally spherical or other fully curved surface and then immediately begin to converge all incoming rays to an ultimate focal point import such disadvantages as the difficulty in controlling, particularly in mass production, accurately curved surfaces on all axes and cause the use of adjustment elements which increases the cost. It is simpler and less expensive to use plano-concave surfaces which may be made in strips rather than spherical surfaces which must be made, ground, and polished each individually. Therefore it is definitely to a great advantage to use a system in which plano-concave surfaces form the main elements.

An object of this invention resides in the use of cylindrically curved concave surfaces as primary elements of the optical system.

An advantage of the present system is found in the less expensive construction inherent in the use of cylindrically curved reflective surfaces from both manufacturing and assembly standpoint.

A primary object is found in the manner in which reflective surfaces of the optical system are formed and located in relation to each other in order to focus light through different stages than done heretofore.

Generally described, the present system employs two primary cylindrically curved reflective surfaces which are preferably of the reflective concave type. These reflective surfaces are positioned somewhat in opposed relation so that light received on the first one is reflected onto the second one which in turn will reflect light on beyond. Image light is considered to be parallel and enters onto the cylindrically curved reflective surface of the first element which converges the rays with respect to only one axis and permits the light to continue in reflection in parallel with respect to the other axis. The second element converges the lightrays in the same manner and is positioned with its optical axis (axis along which convergence takes place) 90 degrees from the optical axis of the first element. The first element, therefore, converges light in the pattern of a wedge with respect to one axis only and reflects it onto the surface of the second element. The second element then transfers the incoming converging rays in their same relationship and also reflects the incoming parallel rays as converging rays so that the light pattern now is in the form of two different sets of converging rays in planes 90° apart. A third reflective element is used to synchronize or adjust the varied convergence in order to focus at a distant focal point.

Other objects and advantages of our system will be apparent in reading the following description taken in conjunction with the accompanying drawings in which:

Fig. 1 is a diagrammatic pictorial view of a typical arrangement of our system with straight lines and arrowheads to illustrate the path of light rays.

Fig. 2 is a pictorial view of a substitute element for a portion of Fig. 1.

Figure 3:
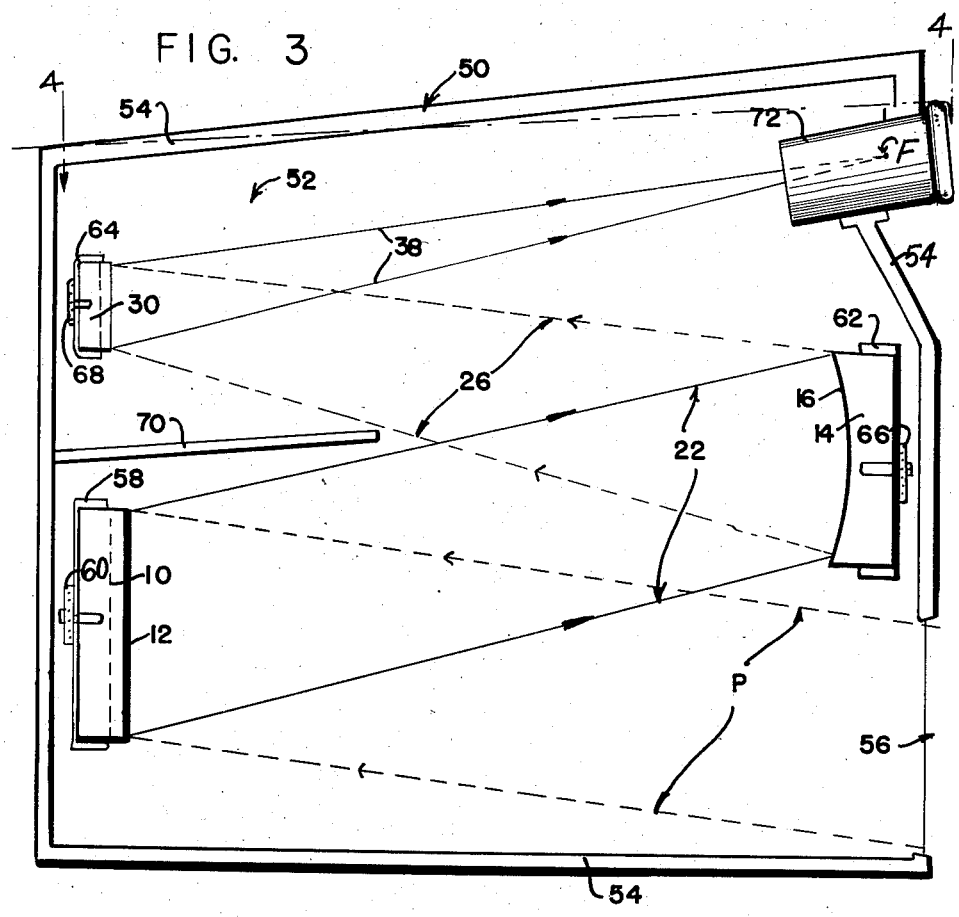
Fig. 3 is a top plan view of a telescope utilizing the present system with straight lines and arrowheads representing the path of light.

It is stated at the outset that the drawings are primarily of illustrative value in conjunction with this description as all surfaces are greatly exaggerated and the pictured location of the reflective elements is exaggerated in order to eliminate much of the confused crossing of lines which would result should the elements be shown in nearly true relation. In Fig. 1, a first reflective element 10 is in the form of a highly polished cylindrically curved concave surface 12 being curved in a vertical plane V and about a straight line parallel to the horizontal line H. The curvature of this surface is such that parallel light P coming in to strike the face 12 is reflected generally back in the same direction with light in parallel planes having the same angles to axis H and lines parallel thereto will be parallel, as shown by Y, while light in the V planes hitting the curved surface 12 will be reflected in convergence as shown by X and X2. Accordingly, a second reflective element 14 with cylindrically curved concave face surface 16 and having a vetrical axis 18 is placed normal to its horizontal optical axis 20 in position parallel to the corresponding axis H of the element 10. The axes HV define a plane through the element 10 and the axes 18, 20 define a corresponding plane through the element 14. These imaginary planes are parallel placing the elements 10, 14 in parallel opposition so that the light rays reflected from 12 include the upper rays 22 leading downwardly to the lower rays 24. Rays 22 are parallel to each other; rays 24 are also parallel to each other; rays 22 are converging with a respective ray 24 at a focal line which is somewhere behind element 14 so that the pattern of light formed as the solid bounded by rays 22, 24 is in the shape of a wedge which is intercepted at the face 16 of element 14. The distance between elements 10 and 14 is a matter of choosing the focal length desired in the elements 10 and 14 which is a function of the radius of curvature of their respective surfaces.

Element 14 being the same as 10 except with respect to focal length has the same effect on light rays striking the face 16 thereof so that the parallel sets of rays 22 and 24 now strike the curvature of face 16 (since the axis of element 14 is 90 degrees from the corresponding axis of element 10) and are reflected as converging sets of rays 26, 28. The rays 22, 24 which strike surface 16 while converging, are reflected in convergence in the same relation and same degree of convergence. The pattern of light formed as a solid by rays 22 and 24 is progressing from an irregular shape made up of sets of lines 26 and 28 with different degrees of convergence depending upon the relationship between the focal length of 12 and 16 and the distance there between which normally would not focus a true proportioned image at any common line or point. For this reason, a third element 30 with plano-concave surface 32 is positioned with its axes 34, 36 in identical position as the corresponding axes V, H of element 10 and in opposed relation to element 14 within the area of rays 26, 28. The location of element 30 is based upon the focal lengths of elements 10 and 14 and the focal length of element 10 must be greater than the total of the focal length of element 14 plus the separation of elements 10 and 14 so that the focal point of element 10, if uninterrupted, would be beyond the focal point of element 14, if uninterrupted. Therefore, the light converged by element 14 will have greater convergence than the light converged by element 10. Since the convergence of light with an incoming rectangular pattern of light P striking 10, from element 10 started ahead of the convergence of light from element 14, and were partially converged as they reached element 14, the pattern of light striking element 14 will be substantially wedge shaped and the same light leaving 14 will be irregularly oval. As the rays extend further beyond element 14 the oval pattern will reduce toward a circle, and when the rays of the new convergence on element 14 converge to a position where the total convergence is equal to the total convergence of element 10, the ray pattern of this accumulated convergence (assuming perfect surface formation) will then be a circle. This position is the location of element 30. If the incoming light P were controlled by an aperture (not shown) to be circular, then the pattern would change from a wedge to a distorted cone in the transfer from 10 to 14 but the characteristic of convergence about one axis and parallelism about the other would remain.

Element 30 is set in a plane parallel to elements 10 and 14 and, since it is positioned the same as element 10, it reflects the rays converged by element 14 without changing their degree of convergence. The focal length of the curvature of element 30 is such that it creates convergence to the rays that were originally reflected by element 10 to it so that these rays will fall at a point F beyond element 30 that is to be the principal focal point of the entire system. Therefore, element 30 serves as an adjustor or syncronizer of the rays 38 so as to place them in the same degree of convergence to bring them to the common focal point F. Use of a plano-concave element 30 in this manner gives a net effective focal length for this system equal to the focal length of the curved surface 16 of element 14. Under certain conditions it may be desirable not to use a third cylindrical surface 32 and to view the image out of proportion somewhere within the focal length of surface 16, preferably at the focal point of surface 16, which is accomplished with the same surfaces 12 and 16 simply by changing the distance between them to bring the two separate groups of converging lines into common convergence beyond surface 16. This is particularly useful for photographic purposes where the film (not shown) would be within the focal length of surface 16 and a distorted image shape would be projected on the film from rays 26, 28. The distortion in the image, after adjustment of distance and/or focal lengths, would show on the film but would also be eliminated when the image is projected back through the system from some place within the focal length of 16 back through 12 and onto a screen in front of P. Such an arrangement provides an inexpensive form of photography and projection not found in conventional systems. The projected image may be made to assume large proportions for easier viewing In the modification shown in Fig. 2, the plano-concave element 30 of Fig. 1 is replaced by a plano-convex element 40 having a reflecting surface 42. The effect of this is to produce a net effective focal length greater than would be produced when element 30 is used. The element 40 is set with the planes through its axes, vertical axis 44 and horizontal axis 46, parallel to the planes of elements 10 and 14 in the same manner as is element 30 and with the plane axis 44 parallel to axis 18 of the element 14. It passes the rays converged by element 10 on its curved surface along the plano surface so that the original degree of convergence is not changed. The convex curvature of this element 40 is an amount required to change the convergence of the rays converged by element 14 so that their convergence will be the same as the rays originally converged by element 10, as they leave element 40. Therefore the rays in both principal axes as they leave the reflecting surface of element 40 have assumed the same angle of convergence and will leave element 40 in a cone of rays 48 and come to a focus at point F2. The effective focal length of this system will then be the actual focal length of the curved surface of element 10.

Figure 4:
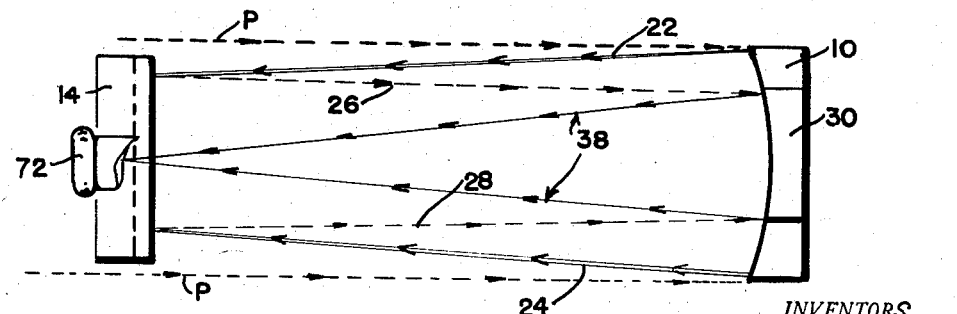
Fig. 4 is a cross-sectional view taken substantially along line 4—4 of Fig. 3 and with straight lines and arrowheads showing the path of light in a vertical plane.

The telescopic arrangement in Fig. 3 has the system mounted in a light proof box 50 with bottom 52 and side walls 54 discontinuous at one end 56 thereof to admit light P as from an image. Element 10 is mounted in an adjustable frame 58 with adjustment screw 60 and elements 14, 30 are likewise mounted in adjustable frames 62, 64 with screws 66, 68, respectively. A light shield 70 is mounted between elements 14 and 30 and a conventional adjustable eyepiece 72 is mounted on box 50 at the general location of the focal point F of the system. The lines and arrows show the path of those rays as seen in a horizontal plane. Rays P remain parallel when reflected from 10 and they strike surface 16 as rays 22 which are converged into rays 26 by element 16 and continue their convergence from element 30 as rays 38 to focal point F in eyepiece 72. Observing the movement of the light rays in a vertical plane shown in Fig. 4 it is seen that the incoming light rays P are converged in stages beginning with the double lines 22, 24 from element 10, changing to dotted lines 26, 28 from element 14, assuming final convergence as rays 38 from element 30 and ending at the eyepiece 72 in a focal point. Simple substitution of the element 40 for the element 30 will, as mentioned heretofore, increase the focal length when required.

In manufacturing the elements 10, 14, 30, and 40 it is necessary only to grind and polish one surface, such as 12 on element 10, and only in one fixed degree of curvature. With this arrangement, the several plano-concave elements may be formed as a continuous strip. The material used may be glass or other suitable material having characteristics permitting grinding and polishing. If slight errors are made in the grinding or forming of a curve on an element it is possible that simple compensatory adjustment may be made by changing the distance between elements. These and other characteristics of our system make it extremely useful for a number of optical applications.

Although we have shown and described preferred embodiments of our system along with a discussion of the operation, action, and re-action thereof, this is by way of illustration only and is not to be construed as being the only form of our invention. Various modifications, eliminations, substitutions, and alterations may be made in the system herein presented without departing from the scope of our invention as defined in the appended claims.

We claim:

1. In a reflective optical system formed of a plurality of cylindrically shaped concave reflecting surfaces, first means for intercepting all of a group of incoming light rays and reflecting all of them with the rays parallel in one axis and converging in the other axis forming a converging pattern of light, second reflecting means receiving said pattern of light and reflecting same with the parallel incoming rays assuming convergence and with the converging incoming rays reflected in the same degree of convergence, the focal length of said first means being greater than the total of the focal length of said second means plus the separation thereof and positioned so that the uninterrupted focal point of said first means is beyond the focal point of said second means, thereby forming a pattern of light having different degrees of convergence and a third reflecting element positioned to receive all the incoming pattern of light to converge all converging rays while bringing them to a common distant focal point, said last named means being an optical element with the optical axes thereof corresponding to respective optical axes of said first and second means, said means also being positioned and located with the optical focal lengths thereof to receive converging rays from said first means in one optical axis thereof by the way of said second means to bring same to a focal point and to receive rays of different convergence from said second means to being same to the identical focal point, thereby converge said differently converging rays to a common focal point.

2. In a reflective optical system formed of a plurality of cylindrically shaped concave reflecting surfaces, a first reflective surface positioned to intercept all of a group of incoming light rays and contured to reflect same parallel about one planar axis of the reflective surface and in convergence about the optical axial plane 90 degrees from said first plane, a second reflective surface positioned in spaced relation to said first surface in such a manner as to receive said reflected rays and being contured to reflect said incoming rays with the parallel rays in convergence about a planar axis and with the converging rays continuing in the same relative convergence, the focal length of said first surface being greater than the total of the focal length of said second surface plus the separation thereof so that the uninterrupted focal point of said first surface is beyond the focal point of said second surface, and a third reflective surface positioned to receive said rays reflected from said second surface and contured to converging the incoming converging rays to cause them to assume the same degree of convergence and to reflect same to a distant focal point, said last named third surface being an optical element with the optical axes thereof corresponding to respective optical axes of said first and second surfaces, said element being located with the optical focal length thereof so as to receive from said first surface rays in one optical axis thereof transferred from said second element to bring same to a focal point and to receive rays of different convergence from said second surface to bring same to the identical focal point, thereby converging said differently converging rays to a common focal point.

3. In a reflective optical system formed of a plurality of cylindrically shaped concave reflecting surfaces, a first cylindrically concave reflective surface positioned to intercept all of a group of light rays and to reflect same with the rays parallel in the plane of the cylindrical axis and converging in planes 90° with respect to the optical concave cylindrical axis and forming a tapered light pattern, a second cylindrically concave reflective surface spaced from and positioned to receive the reflected pattern of light from said first reflective surface with the cylindrical optical axis thereof positioned 90 degrees from the concave optical axis of said first reflective cylindrical surface, said second surface reflecting said light pattern with the incoming parallel rays assuming a converging relation about the cylindrical optical axis and with the incoming converging rays reflected in their same relationship thereby forming a pattern of light having different degrees of convergence, the focal length of said first surface being greater than the total of the focal length of said second surface plus the separation thereof so that the interrupted focal point of said first surface is beyond the focal point of said second surface, and a third reflecting optical element positioned to receive said last named pattern of light from said second reflective surface and being formed to converge the incoming converging rays and bring them to a common distant focal point, said last named element having the optical axes thereof in cooperative relation to respective optical axes of said first and second surfaces, said element being located with the optical focal length thereof so as to receive converging rays from said first surface and in one optical axis thereof by the way of said second surface to bring same to a focal point and to receive rays of different convergence from said second surface to bring same to the identical focal point, thereby converging said differently converging rays to a common focal point.

4. The system in claim 3 in which last last named optical element is a cylindrically concave reflective surface positioned to receive the pattern of light from said second reflective surface.

5. In a reflective optical system formed of a plurality of cylindrically shaped concave reflecting surfaces, a first cylindrically concave reflective surface positioned to intercept all of a continuous pattern of incoming parallel light rays and to reflect same with parallel rays along the plano axis and converging rays along the optical axis forming a wedge-shaped pattern of light, a second cylindrically concave reflective surface spaced from and positioned to receive the reflected pattern of light from said first reflective surface with the concave optical axis thereof positioned 90 degrees from the concave optical axis of said first reflective surface, said second surface reflecting said light pattern with the incoming parallel rays assuming a converging relation about the concave optical axis and with the incoming converging rays reflected in their same relationship thereby forming a pattern of light having different degrees of convergence, the focal length of said first surface being greater than the total of the focal length of said second surface plus the separation thereof so that the interrupted focal point of said first surface is beyond the focal point of said second surface, a third contoured reflective surface positioned to receive said last named pattern of light from said second reflective surface and being formed to converge the incoming converging rays and bring them to a common distant focal point, the focal length of said first reflective surface and distance from said second reflective surface being such that the converging rays therefrom have not intersected prior to reaching said second or third reflective surfaces and the focal length and distance of said second surface being the same with respect to said third surface, said last named third surface being an optical element with the optical axes thereof corresponding to respective optical axes of said first and second surfaces, said element being located with the optical focal length thereof so as to receive from said first surface rays converging by way of said second surface in one optical axis to bring same to a focal point and to receive rays of different convergence from said second surface to bring same to the identical focal point, thereby synchronizing said differently converging rays to a common focal point.

6. In a reflective optical system formed of a plurality of cylindrically shaped concave reflecting surfaces, a first plano-concave reflecting surface positioned to intercept all of a continuous pattern of light rays and to reflect same with the rays parallel in the plane of the cylindrical axis and converging in planes 90° with respect to the cylindrical axis of the curved reflecting surface and forming a tapered light pattern, a second plano-concave surface spaced from and positioned with the axis thereof substantially in opposed relation to receive the reflected pattern of light from said first reflective surface and having the concave surface and its axis positioned 90 degrees from the same corresponding surface and axis of the first surface, said second surface reflecting said light pattern with the incoming parallel rays assuming a converging relation about the concave optical axis and with the incoming converging rays reflected in their same relationship thereby forming a pattern of light having different degrees of convergence, the focal length of the first surface being greater than the total of the focal length of the second surface plus the separation of said first and second surfaces so that the light pattern of the converging rays from the first surface have not reached a focal point prior to the converging rays from the second surface, and a third reflective surface positioned to receive in alignment the pattern of light reflected from said second reflective surface and being contured to reflect same with the different incoming converging rays adjusted in to converge so that they reach a common distant focal point, said last named reflective surface being a cylindrical optical element with the optical axes thereof converging to respective optical axes of said first and second surfaces, said element being located with the optical focal length thereof such as to receive from said first surface rays converging by way of said second surface in one optical axis to bring same to a focal point and to receive rays of different convergence from said second surface to bring same to the identical focal point, thereby synchronizing said differently converging rays to a common focal point.

References Cited in the file of this patent
UNITED STATES PATENTS

| | | |
|---|---|---|
| 1,552,451 | Roach | Sept. 8, 1925 |
| 1,698,905 | Beechlyn | Jan. 15, 1929 |
| 1,747,928 | Chesney | Feb. 18, 1930 |
| 1,785,347 | Herrschaft | Dec. 16, 1930 |
| 2,157,138 | Mendez | May 9, 1939 |
| 2,252,246 | Bergmans et al. | Aug. 12, 1941 |
| 2,296,943 | Okolicsanyi | Sept. 29, 1942 |
| 2,576,147 | Sauvage | Nov. 27, 1951 |
| 2,653,249 | Harker | Sept. 22, 1953 |